Feb. 20, 1968 J. F. HOFFER 3,369,491
ENERGY TRANSFER MECHANISM
Filed Jan. 11, 1966 4 Sheets-Sheet 1
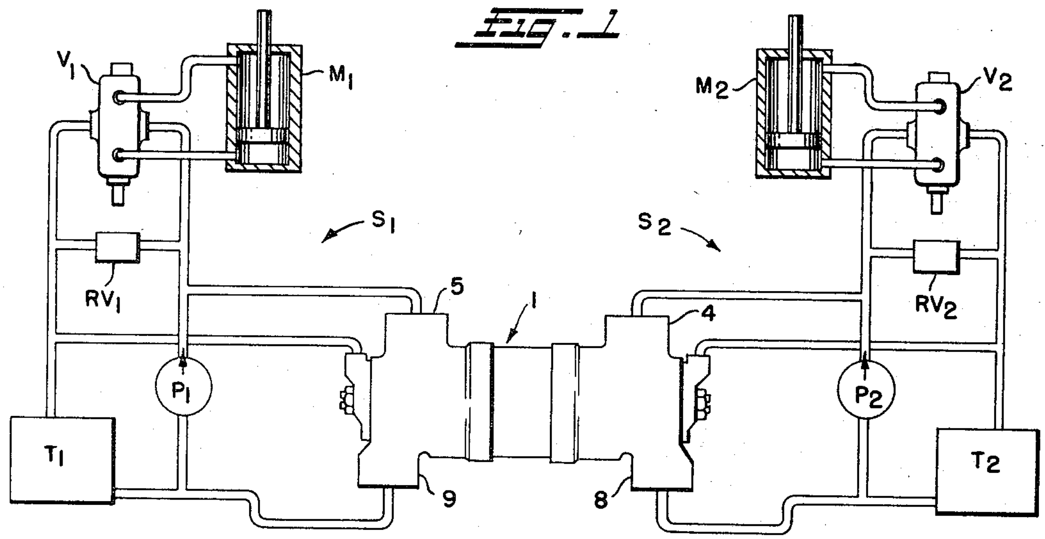
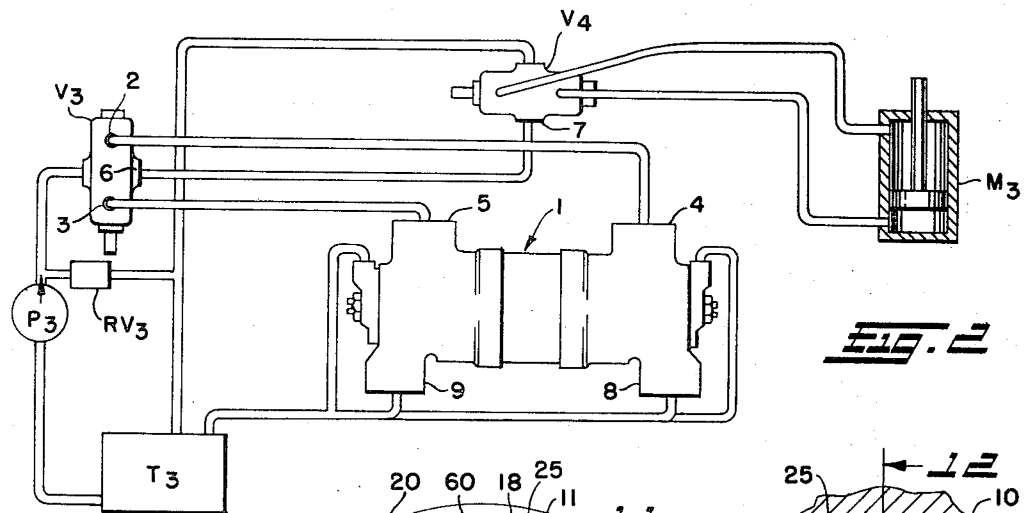
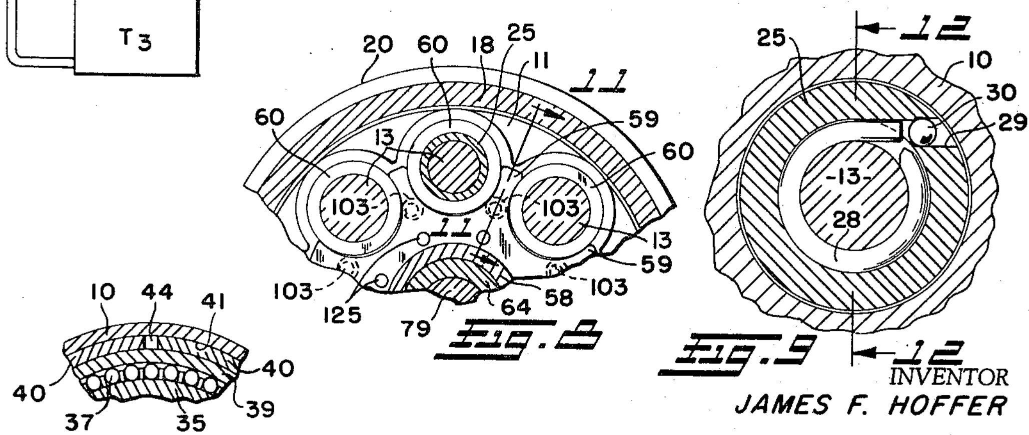
INVENTOR
JAMES F. HOFFER
BY *Oberlin, Maky & Donnelly*
ATTORNEYS ENERGY TRANSFER MECHANISM
Filed Jan. 11, 1966 4 Sheets-Sheet 2
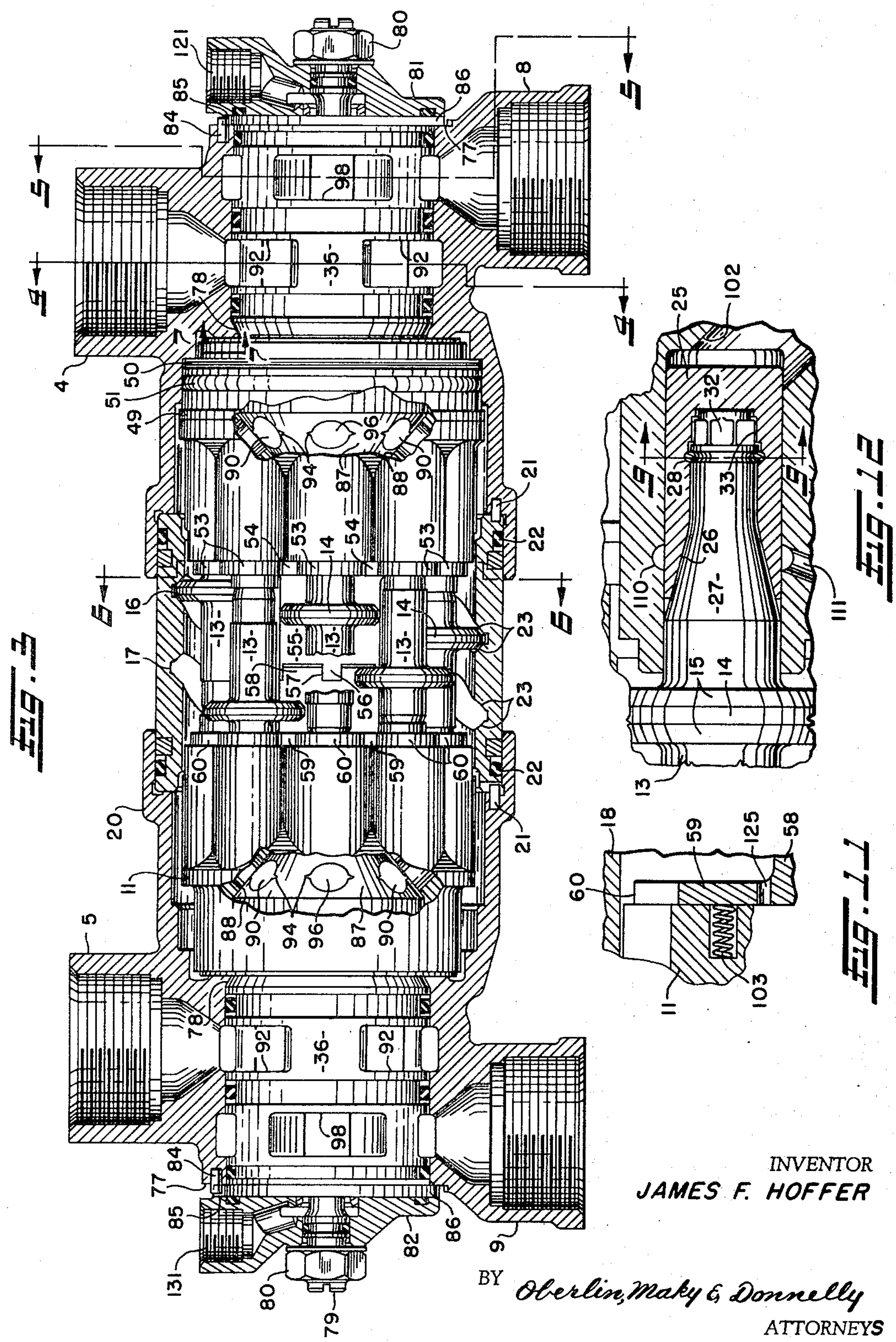
INVENTOR
JAMES F. HOFFER
BY Oberlin, Maky & Donnelly
ATTORNEYS

ENERGY TRANSFER MECHANISM

Filed Jan. 11, 1966 4 Sheets-Sheet 3

INVENTOR
JAMES F. HOFFER

BY Oberlin, Maky & Donnelly
ATTORNEYS

ENERGY TRANSFER MECHANISM
Filed Jan. 11, 1966 4 Sheets-Sheet 4
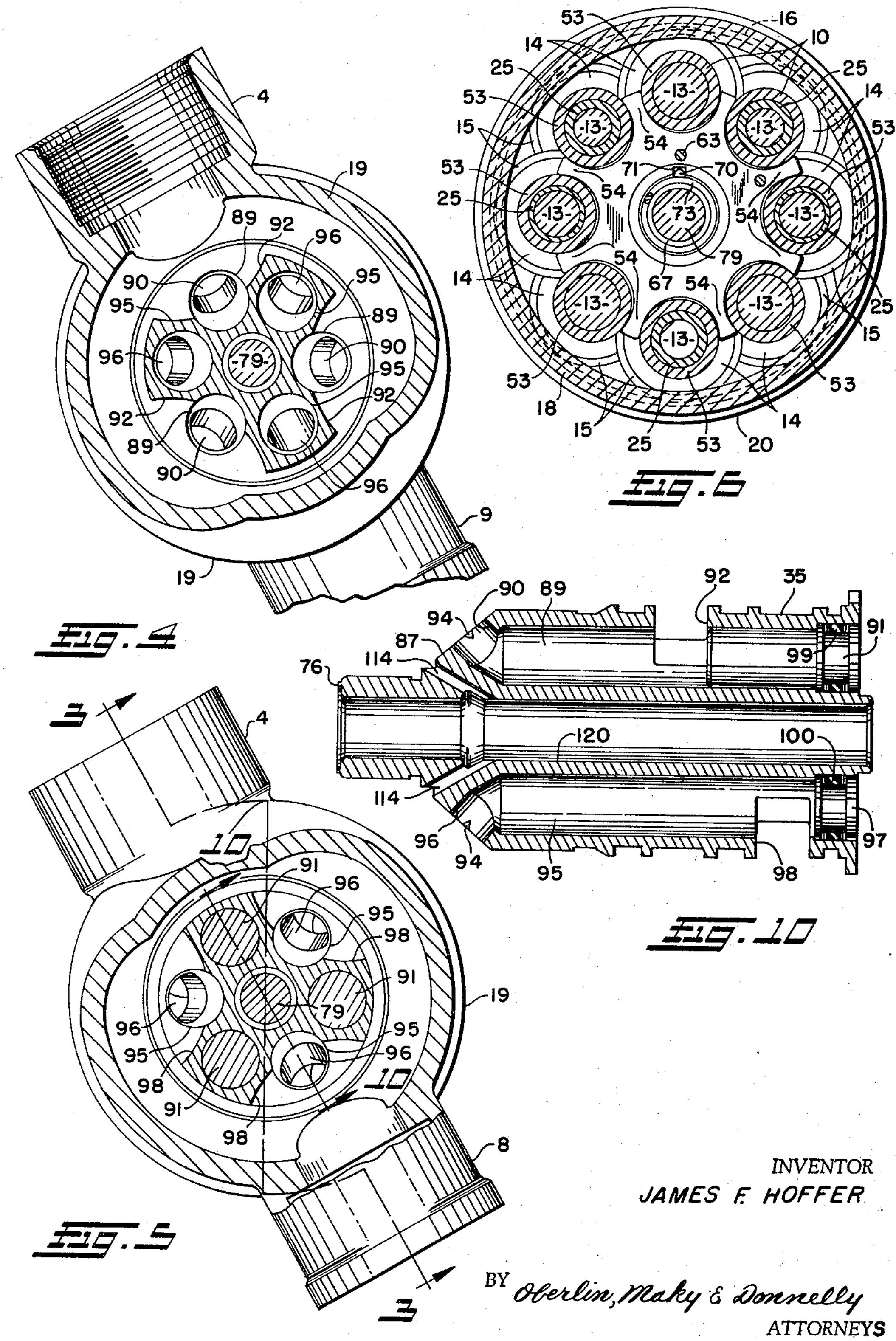
INVENTOR
JAMES F. HOFFER
BY Oberlin, Maky & Donnelly
ATTORNEYS United States Patent Office 3,369,491 Patented Feb. 20, 1968

1

3,369,491
ENERGY TRANSFER MECHANISM
James F. Hoffer, Redondo Beach, Calif., assignor to Parker-Hannifin Corporation, Cleveland, Ohio, a corporation of Ohio
Filed Jan. 11, 1966, Ser. No. 520,001
26 Claims. (Cl. 103—45)

ABSTRACT OF THE DISCLOSURE

An energy transfer mechanism having a pair of rotary devices each capable of operating as either a motor or pump and connected to two separate fluid systems. The rotary device operated as a motor serves as a pump for the other rotary device.

*Disclosure*

The present invention relates generally to an energy transfer mechanism and more particularly to a mechanism which is in the form of a motor-pump for connection to two separate fluid systems and is capable of being operated as a motor by either system and when so operated serves as a pump for the other system.

In aircraft hydraulic systems, for example, it is common practice to provide a plurality of hydraulic systems each having its own pump, tank, and one or more fluid motors and associated directional control valves. One disadvantage of such systems is that under certain conditions of operation, the demand for fluid by the motor or motors may be such that the pump of that system cannot maintain desired high pressure. This problem may be alleviated by installation of pressure accumulators in the respective hydraulic systems to assist in maintaining system pressures under surge or large demand conditions. However, such accumulators are generally designed to handle short duration surges that occur as when first initiating the operation of a fluid motor. To handle sustained surges, such accumulators would be of prohibitive size and weight.

It is a principal object of this invention to provide a hydraulic energy transfer mechanism which is adapted to be installed between two independent fluid pressure systems in such manner that when the fluid pressure in either system is higher than in the other the differential in such pressure will drive the mechanism so that it has a fluid power output to augment the output of the pump of the other system, thus to minimize the pressure drop in such other system as occasioned by large capacity demand of the fluid motor or motors threeof.

It is another object of this invention to provide a fluid energy transfer mechanism which may readily be adapted in a fluid pressure system selectively as a pressure booster (or intensifier) or as a pressure de-booster.

It is another object of this invention to provide a fluid energy transfer mechanism of the character indicated which is highly efficient, both mechanically and hydraulically, and which is of simple, lightweight and compact structure.

It is another object to provide a mechanism of the type described for installation between two separate hydraulic systems in which mechanism means are provided for preventing leakage of fluid from one system to the other.

Another object is to provide a pump-motor mechanism with full flow valved passages for pump-motor operation while yet providing fluid pressure seating of the valve elements.

Other objects and advantages of the present invention will become apparent as the following description proceeds.

2

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In the drawing:

FIG. 1 is a schematic piping diagram showing two hydraulic systems with the mechanism of the present invention installed therebetween;

FIG. 2 is a schematic piping diagram showing the mechanism of this invention adapted selectively for use as a pressure booster or pressure de-booster;

Figure 3A:
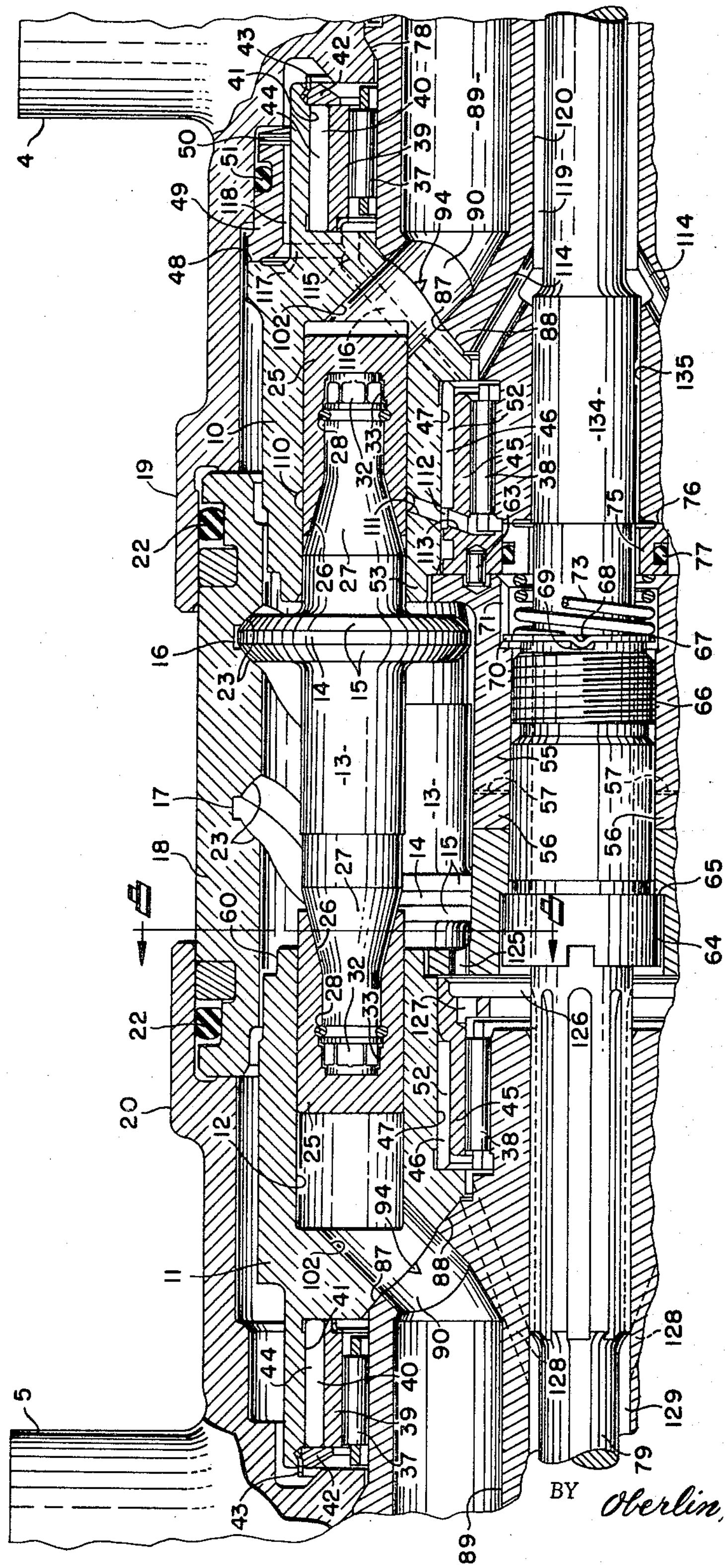
FIG. 3 is a central longitudinal cross-section view taken along line 3—3 of FIG. 5.

FIG. 3*a* is an enlarged fragmentary cross-section view similar to FIG. 3 showing details of internal construction;

FIGS. 4, 5, 6, and 7 are transverse cross-section views taken respectively along the lines 4—4, 5—5, 6—6, and 7—7, of FIG. 3;

FIG. 8 is a fragmentary transverse cross-section view taken along the line 8—8 of FIG. 3*a*;

FIG. 9 is a fragmentary cross-section view taken along line 9—9 of FIG. 12;

FIG. 10 is a longitudinal cross-section view taken along the line 10—10 of FIG. 5;

FIG. 11 is a fragmentary cross-section view taken along line 11—11 of FIG. 8; and FIG. 12 is a cross-section view taken along line 12—12 of FIG. 9.

Referring to FIG. 1, there is shown therein two independent hydraulic systems S1 and S2 each having a pump P1 and P2, a tank T1 and T2, a directional control valve V1 and V2, a fluid motor M1 and M2 and a relief valve RV1 and RV2. Installed between said systems S1 and S2 is the hydraulic energy transfer mechanism 1 constituting the present invention which is so arranged that if there is a drop in output pressure in system S1 the left-hand portion of the mechanism 1 operates as a pump to supplement the output of P1, thus to maintain pressure in system S1 for operation of motor M1. The right-hand portion of the mechanism 1 in that case constitutes a fluid motor for driving the left-hand pump portion, said right-hand fluid motor being driven by fluid pressure in system S2. Conversely, if system S2 is in use and pressure delivered by the pump P2 drops, the right-hand portion of the mechanism 1 will function as a pump to suppement the output of pump P2 thus to maintain the desired pressure in system S2, the left-hand portion of the mechanism 1 then functioning as a fluid motor to drive the right-hand pump portion.

Referring now to FIG. 2, the mechanism 1 herein may readily be adapted for use as a pressure booster or pressure debooster simply by making the motor-pump pistons of larger diameter at one end than at the other end. In the FIG. 2 schematic diagram there is provided a tank T3, a relief valve RV3, a pump P3 having its pressure delivery port connected to the pressure inlet port of a four-way valve V3 of which the service ports 2 and 3 are connected to the respective ports 4 and 5 of the mechanism 1 and the outlet port 6 is connected to the inlet port 7 of another four-way valve V4. The valve V4 is connected in conventional manner to control the direction of operation of fluid motor M3 by fluid entering the inlet port 7. Thus, the delivery pressure from the pump P3 may be selectively transmitted by valve V3 to either of high pressure ports 4 or 5 of mechanism 1, whereby the pressure at the other port 5 or 4 of said mechanism 1 is either higher or lower than the P3 pump pressure so that the desired higher or lower pressure is conducted to the directional control valve V4 and to the motor M3. The ports 8 and 9 of mechanism 1 are low pressure return ports connected to tank T3.

As shown in FIGS. 3 to 12, the mechanism 1 comprises a pair of opposed cylinder blocks 10, 11, each having a circular series of cylinder bores 12 in which double ended pistons 13 are reciprocable. In the present case there are shown eight pistons, each having a cam follower flange 14 of enlarged diameter with opposite faces 15, 15 constituting spherical zones of two different spheres. Alternate pistons 13 have their flanges 14 engaged in respective parallel sinusoidal cam tracks 16, 17 formed in a housing sleeve 18 which is clamped between housing members 19, 20 and keyed thereto by dowels 21 and sealed by packings 22. The sides 23 of each cam track are on a radius corresponding to that of cam follower faces 15, 15.

Attached to the ends of pistons 13 are cup-shaped piston heads 25 having flared open ends 26 (see FIGS. 9 and 12) opposite conical portions 27 of the pistons. The piston heads are secured to pistons 13 by wire lock rings 28 inserted through a tangential opening 29 into opposed semicircular grooves formed in the ends of piston 13 and the interior of piston heads 25. A ball 30 in each of the openings 29 serves to close the same to prevent leakage of fluid therethrough. The ends of pistons 13 have hexagonal portons 32 received within hexagonal recesses 33 in piston heads 25 to key the parts together so that rotation of the pistons 13 about their axes will likewise cause rotation of the piston heads 25 within cylinder bores 12.

Cylinder blocks 10 and 11 are mounted for rotation respectively on a pair of pintles 35, 36, there being needle bearings 37 interposed between relatively large diameter cylindrical portions of the pintles and cylinder blocks and needle bearings 38 interposed between relatively small diameter portions.

Bearings 37 are surrounded by bearing races 39 contained within segmental nylon spacers 40 mounted within counterbores 41 of cylinder blocks 10, 11 and retained therein by washers 42 and ductile metal lock rings 43.

Nylon spacers 40 are for accommodating unequal expansion and contraction between races 39 and the opposed counterbored portions of cylinder blocks 10, 11, these parts being of different materials. Spacers 40 have a tight fit against races 39 and the walls of counterbores 41 of the cylinder blocks to maintain concentricity of the races with the counterbore walls. When the temperature of the parts go up or down there is differential expansion or contraction between the races and counterbore walls that increases or decreases the annular spaces therebetween in which the nylon spacers 40 are received. The spacers are segmental and the ends of the segments have spaces 44 (see FIG. 7) therebetween to permit the spacer material, which is somewhat resilient, to circumferentially expand or contract to accommodate thinning or thickening of the radial thickness of the spacers as the annular spaces in which they are contained decrease or increase in radial dimension. Thus the nylon spacers 40 at all times maintain contact with bearing races 39 and the cylinder block counterbore walls 41 to keep the same concentric and to cause bearing races 39 to rotate with their respective cylinder block 10 or 11.

Bearings 38 are likewise surrounded by bearing races 45 contained within segmental nylon spacers 46 mounted in bores 47 of the cylinder blocks and having spaces 52 between the segments for the same purpose as spaces 44 between spacers 40.

Cylinder block 10 has an annular sealing surface 48 that makes sealing contact with a ring 49 that is pressed toward cylinder block 10 by a wave spring 50, the ring being sealed by packing 51 relative to housing member 19.

Cylinder blocks 10 and 11 are keyed together so as to rotate in unison. Thus, cylinder block 10 has inwardly projecting circular bosses 53 surrounding the angularly spaced cylinder bores 12 therein. Bosses 53 fit snugly between and engage radially projecting fingers 54 (see FIG. 6) on one end of a sleeve 55. The other end of sleeve 55 has tongues 56 thereon which fit into slots 57 in one end of another sleeve 58. The other end of sleeve 58 has radial fingers 59 that fit snugly between circular bosses 60 on cylinder block 11. Thus sleeves 55, 58 provide a driving connection between cylinder blocks 10 and 11 so that they always rotate in unison. Two sets of tongues 56 and grooves 57 are slightly offset relative to the axial centerline of the sleeves so that sleeves 55 and 58 may be engaged via the tongues and grooves in only one angular position relative to each other to correspond with an angular position to which the parts have been preassembled and machined with fingers 54 in sleeve 55 in accurate axial alignment with fingers 59 of sleeve 58.

Bearing races 45 rotate with their respective cylinder blocks 10, 11 because of the tight contact of the races and cylinder blocks with nylon spacers 46. Pin 63 pressed in race 45 prevents improper assembly wherein sleeve 58 instead of sleeve 55 might be assembled to engage cylinder block 10. Sleeves 55 and 58 are held in tight endwise engagement with each other by means of a hollow bolt 54 having shouldered engagement at 65 with sleeve 58 and threaded engagement at 66 with sleeve 55. A washer 67 has detent means 68 engageable with slots 69 in the end of bolt 64 and has a radially projecting tab 70 engaged in a longitudinal groove 71 in sleeve 55 to provent inadvertent unthreading of bolt 64 from sleeve 55. A spring 73 bears against washer 67 to maintain a detent 68 within a slot 69 and also bears against a sealing bushing 75 to maintain the latter in endwise sealing engagement with an annular sealing surface 76 on pintle 35.

By providing two sets of sinusoidal cam tracks 16, 17, the flanges 14 of alternate pistons 13 may circumferentially overlap, as shown in FIG. 6, thus making possible a smaller diameter circle on which the centers of piston bores 12 are located than if the flanges of each piston were engaged in a single cam track. This results in a smaller overall diameter and less weight for the mechanism.

Extending through mechanism 1 is a rod 79 which has nuts 80 threaded thereonto to clamp sleeve 18, body parts 19, 20, pintles 35, 36 and drain port adapters 81, 82 together, the drain port adapters being for the purpose of conducting leakage fluid back to the tanks T1 and T2 of the respective systems S1 and S2 when the mechanism 1 is used as described in connection with FIG. 1.

The inward axially directed pressure from nuts 80 is transmitted to drain port adapters 81, 82 and then to the outer end surface of respective pintles 35, 36 and by the latter to tapered shoulders 78 on housing members 19, 20 to clamp the latter endwise against housing sleeve 18. Housing shoulders 78 are disposed inwardly of the respective housing members 19, 20 a substantial distance and the outer end surfaces 77 of the housing members have an endwise clearance with other portions of the pintles and the drain port adapters to permit pressure deflection and thermal expansion of those portions of the housing members axially outward of shoulders 78 without imposing additional load to rod 79.

Pintles 35, 36 are mounted within housing members 19, 20, respectively, and are angularly locked relative thereto so as to be a part thereof by means of dowels 84 mounted in body members 19, 20 and engaged in slots 85 in radial projecting flanges 86 of the pintles. Each of the pintles 35, 36 has a frusto-conical valve seat 87 engaging with a respective and complimentary frusto-conical valve surface 88 of cylinder blocks 10, 11. Each pintle also has three angularly spaced and longitudinally extending high pressure passages 89 terminating at one end in circular ports or openings 90 that intersect at nearly right angles with pintle valve seats 87 and whose other ends are closed by plugs 91. Each of the high pressure passages 89 in pintle 35 communicate with high pressure port 4 by means of arcuate slots 92 in the pintle. Likewise, each of the pressure passages 89 in pintle 36 communicate with pressure port 4 by means of like arcuate slots 92 in that pintle.

Each of the pintles 35, 36 also have three longitudinally extending low pressure passages 95 in alternating relation with high pressure passages 89 (see FIG. 4) and communicating at one end with circular openings 96 that intersect pintle valve seats 87 at nearly right angles therewith and whose other ends are closed by plugs 97. Each of the low pressure passages 95 in pintle 35 communicate with low pressure port 8 by means of arcuate slots 98 in the pintle and each of the ports 95 in pintle 36 communicate with port 9 by means of like slots 98 in that pintle. Plugs 91 and 97 are sealed within their respective bores by packings 99, 100 and are retained within such bores by drain port adapters 81. Each of the cylinder bores 12 in cylinder blocks 10, 11 communicate with circular ports or openings 102 that intersect at nearly right angles with frusto-conical valve faces 88 of the respective cylinder blocks and which come into register with pintle openings 90 during rotation of the cylinder blocks upon the pintles.

Because circular openings 102 in the cylinder extend at an angle relative to the cylinder bore axes and intersect frusto-conical faces, the axial projections of openings 102 where they intersect frusto-conical cylinder block valve surfaces 88 are generally elliptical and of less area than the areas of openings 102 transversely of the axes of the latter. As a result, the total projected axial areas of the walls of cylinder bores 12 and openings 102 subject to fluid pressure within the cylinder blocks tending to move the blocks axially toward the respective pintle valve seats is greater than the total projected axial area of the cylinder bores and openings 12 and 102 subject to fluid pressure within such bores and openings tending to move the cylinder blocks axially away from the respective pintle seat whereby the cylinder blocks are maintained against the respective pintle seat by a force proportional to the differential of such areas. Such differential areas subject to cylinder block seating pressures are sufficiently large to overcome gradient pressure of leakage fluid between frusto-conical surfaces 87 and 88 that tend to unseat the cylinder blocks axially from pintle seats 87. Thus the net effect of fluid pressure upon the cylinder blocks is to maintain the cylinder blocks in contact with the frusto-conical seats 87 of the respective pintle. The areas of seats 87 and the above mentioned differential areas are so designed that the net seating force is relatively light so as to maintain a substantial seal and yet avoid excessive friction as the cylinder blocks rotate.

Springs 103 bear against cylinder block 11 and radial fingers 59 of sleeve 58 to yieldably maintain cylinder blocks 10 and 11 against the conical pintle faces 87 when the mechanism is not under fluid pressure or when starting up, sleeve 58 pressing against sleeve 55 and the latter pressing against cylinder block 10. The total force of springs 103 exceeds the force of wave spring 50 to keep cylinder block 10 seated on pintle 35 when there is no fluid pressure in cylinder block 10. In the event of unusual conditions in which momentary shock pressure may tend to move the cylinder blocks away from the pintles, the blocks will engage the axial outerfaces of radial fingers 54 on sleeves 55 and 58 to limit such movement.

In their angularly locked positions, pintles 35 and 36 have their ports 90, 96 axially centered between top dead center and bottom dead center of the sinusoidal cam track undulations so that each cylinder bore 12 is at its point of maximum opening via ports 102 to ports 90, 96 when the respective piston is at mid-stroke, the point of maximum piston velocity and hence maximum rate of fluid flow into or out of the respective cylinder bore 12.

Also, each of the pintle ports 90, 96 has a V-shaped slot 94 (see FIG. 3*a*) cut in each side thereof. These slots serve to modulate the pressure in each cylinder 12 during an interval of several degrees of rotation of the cylinder blocks when the associated piston 13 is at either end of its stroke. During such intervals the cylinder block ports 102 are successively crossing a land on pintle seats 87 separating alternate high and low pressure pintle ports 90, 96. These slots are contoured so that the rate of pressure increase or decrease within the cylinder ports 102 during the above mentioned intervals is optimised to obtain minimum hydraulic shock and minimum interflow or leakage between pintle ports.

In furtherance of the object of keeping the hydraulic fluid in the right-hand portion of the mechanism isolated from the hydraulic fluid in the left-hand portion, that is, the fluid of system S2 isolated from that of S1, there are means provided for preventing leakage fluid from moving from one side of the unit to the other. Thus, with reference to the right-hand end of the mechanism, each cylinder bore 12 in cylinder block 10 has an isolation groove 110 for collecting any fluid leaking outwardly along piston head 25 and directing the same through radial openings 111 to annular groove 112 in bearing race 45 and through radial openings 113 in the latter to needle bearings 38. The leakage fluid passes axially along bearing 38 toward the right-hand end thereof. Fluid leaking radially outwardly between conical seats 87 and 88 has access to the left end of bearing 37 and drains through passages 115 and 116 to the right end of bearing 38. Radial passages 117 permit passage of fluid from passages 115 to annular space 118 between cylinder block 10 and ring 49 by centrifugal action as cylinder block 10 rotates, such fluid passing between retaining washer 42 and body member 19 to bearing 37 and through the latter to lubricate the same and back to passages 115. Passages 115 and 116 also prevent fluid pressure from building up between the right-hand end of cylinder block 10 and body member 19 which would otherwise tend to unseat cylinder block 10 from pintle seat 87. Fluid leaking radially inwardly from pintle passage 90 along pintle seat 87 enters the right end of bearing 38. This fluid passes through openings 114 into annular space 119 between rod 79 and bore 120 in pintle 35 and is discharged back to a reservoir through port opening 121 in drain port adapter 81.

At the left end of the mechanism, leakage of fluid radially outwardly along the conical interface between pintle 36 and cylinder block 11 enters bearing 37 to lubricate the same and passes through the bearing and around the exterior of cylinder block 11 into sleeve 18 along with fluid leaking past left piston heads 25 from their cylinder bores 12. The fluid thus entering sleeve 18 provides lubrication for cam follower flanges 14 in cam tracks 16 and 17. This leakage fluid also enters the space between housing 19 and cylinder block 10 but is prevented from entering the right-hand fluid system by cylinder block sealing surface 48 and packing 51 and by the close fit between piston heads 25 and cylinder bores 12 of block 10. The leakage fluid within sleeve 18 also passes through drilled openings 125 in sleeve 58 to a counterbore 126 and drilled openings 127 in bearing race 45 and into bearing 38 to lubricate the same. Leakage fluid from openings 102 also passes radially inwardly along pintle seat 87 and enters ducts 128 leading to annular space 129 between shaft 79 and pintle 36. From annular space 129 the fluid returns to a reservoir through port 131 of drain port adapter 82. Excess fluid from bearing race counterbore 126 passes through axial grooves 83 in shaft 79 to space 129 and then to drain port 131 and is prevented from passing along rod 79 to the right end of the mechanism by a close plug fit between land 134 of rod 79 and the opposed bore 135 in pintle 35, and also by sealing surface 76 and packing 77.

In operation of the unit with reference to the installation of FIG. 1, when the pressures in systems S1 and S2 are equal, the pressure of fluid entering ports 4 and 5 and pressure passages 89 of the two pintles 35, 36 to act on the opposite ends of the pistons then exposed to passages 89 will likewise be equal. Because all piston heads 25 are of equal diameter, the pistons being acted upon by the two high pressure fluids will be balanced endwise and remain axially motionless and there will be no rotation of cylinder blocks 10, 11 upon pintles 35, 36.

If the pressure in system S1 decreases, there will be a greater pressure in high pressure port 4 than in high pressure port 5 and hence there will be greater pressure acting on the right piston heads 25 than on the left piston heads for those pistons whose cylinders are in communication with pressure passages 89 and the differential of such pressures will move pistons 13 to the left. Because of the engagement of piston flanges 14 in cam track 16, 17, such leftward movement will cause counterclockwise rotation of the cylinder blocks 10 and 11, as viewed in FIG. 6. Such leftward movement of pistons 13 will displace fluid from the left cylinder bores 12 through the left pressure passages 89 and through port 5 to augment the output of pump P1 as the cylinder blocks rotate. Meanwhile, the pistons 13 which are then being moved to the right by cam tracks 16, 17 will draw fluid from Tank T1 through low pressure port 9, lefthand passages 95 and into the left cylinder bores 12 and will expel spent fluid from the right cylinder bores 12 through right passages 95 and low pressure port 8 into tank T2 by registration of such cylinder bores 12 with passages 96 of the two pintles. Thus in this instance the right-hand portion of the mechanism acts as a fluid motor and the left-hand portion as a fluid pump.

Conversely, if the pressure in system S2 decreases while the motor M2 thereof is being actuated, the higher pressure in port 5 will operate the left pistons 13 as a fluid motor in clockwise direction with spent fluid being expelled through port 9 whereby the right pistons 13 will be operated as a fluid pump having a low pressure intake port 8 and a high pressure delivery port 4 to augment the output of pump P2.

In the present case there are 8 equally spaced double ended pistons 13, each having a short end and a long end relative to the flange 14 thereon, alternate ones of which pistons are turned end for end to engage their flanges 14 with respective cam tracks 16 or 17. By way of example, the sinusoidal cam tracks 16, 17 are herein arranged to cause each piston 13 to make three strokes in each direction during each full revolution of the cylinder blocks 10, 11.

The follower flanges 14 are much larger in diameter than piston heads 25 that are non-rotatively keyed to pistons 13 by non-circular portions 32, 33 so that each piston and its heads 25 will rotate about their axes when the cylinder blocks are rotating. Thus piston heads 25 will simultaneously rotate and reciprocate within their respective cylinder bores 12 and as a result will be less subject to seizure in the event that dirt or foreign particles are forced into the small running clearance between the piston heads and the cylinder bores.

When the unit is acting as a motor-pump as above described, the pressure created on the pumping ends of the pistons is on the order of 95% of the pressure on the motor ends of the pistons, the difference repesenting chiefly the energy losses due to the total friction losses of the mechanism when operating. With this substantial hydraulic balancing of the pistons it is unnecessary to provide thrust bearings for taking the reaction of fluid pressure acting on the pistons, as is the case in conventional pumps and motors.

Referring now to the use of this mechanism as a pressure booster or de-booster as shown in FIG. 2, let it be assumed that the double ended pistons 12 are of larger diameter at their right ends than at their left ends. In that case, if the four-way valve V3 is operated to communicate the delivery port of the pump P3 with the left port 5, the output pressure of the mechanism 1 at port 4 will be less than at port 5, whereby the mechanism 1 constitutes a pressure de-booster to provide for increased volumetric capacity at lower pressure. On the other hand, if the valve V3 is operated to conduct the pump P3 pressure to the port 4, then the output pressure at port 5 will be greater than at port 4, whereby the mechanism 1 constitutes a pressure booster to provide for increased pressure at lower volumetric capacity.

It is to be understood that the foregoing examples of the use of the mechanism 1 herein are only two of many different applications. Those skilled in the art may readily adapt the same for use as a flow divider, a flow equalizer, a flow proportioner, or a pressure-flow transformer, in addition to constituting a motor-pump or pump-motor as in FIG. 1, or as a pressure de-booster as in FIG. 2.

Other modes of applying the principles of the invention may be employed, change being made as regards the details described, provided the features stated in any of the following claims, or the equivalent of such, be employed.

I therefore particularly point out and distinctly claim as my invention:

1. A fluid energy transfer mechanism comprising a housing enclosing a pair of rotary devices each including reciprocable pistons, each device being capable of operating as either a motor or a pump, said devices being mechanically connected for rotation in unison, the pistons in each device being mechanically connected to the pistons in the other device, a separate pair of high pressure and low pressure fluid ports communicating with each device, one of said devices operating as a motor when the fluid in the respective high pressure port is higher than the pressure of the fluid in the other high pressure port and driving the other device as a pump, the device operating as a motor receiving fluid through its high pressure port to cause the pistons to reciprocate and discharging such fluid through its low pressure port, the device being driven as a pump taking fluid from its low pressure port and discharging the same through its high pressure port, and cam means in the housing and encircling the pistons, said cam means being engaged by the pistons to cause rotation of said devices as the pistons reciprocate.

2. The mechanism of claim 1 in which each piston has an enlarged circular flange intermediate its ends, each flange has side surfaces at its periphery that are portions of two different spheres, and said cam means comprises a circumferentially continuous axially undulating groove in the housing wall whose sides are complementary to and engaged by the side surfaces of said flanges.

3. The mechanism of claim 1 in which said mechanical connection comprises sleeve means between the devices that has an angularly fixed connection with each device.

4. The mechanism of claim 1 in which the mechanical connection between said devices comprises projections extending axially from opposed faces of said devices, and sleeve means between said devices having openings at each end thereof receiving said projections.

5. A fluid energy transfer mechanism comprising a housing enclosing a pair of rotary devices each including reciprocable pistons, each device being capable of operating as either a motor or a pump, said devices being mechanically connected for rotation in unison, the pistons in each device being mechanically connected to the pistons in the other device, a separate pair of high pressure and low pressure fluid ports communicating with each device, one of said devices operating as a motor when the fluid in the respective high pressure port is higher than the pressure of the fluid in the other high pressure port and driving the other device as a pump, the device operating as a motor receiving fluid through its high pressure port to cause the pistons to reciprocate and discharging such fluid through its low pressure port, the device being driven as a pump taking fluid from its low pressure port and discharging the same through its high pressure port, said pistons being in a circular array, two sets of circumferentially continuous axially spaced cam tracks within said housing, alternate ones of said pistons having their flanges engaged in one set of said cam tracks, the other of said pistons having their flanges engaged in the other set of cam tracks and circumferentially overlapping the flanges of said alternate pistons whereby the diameter of said circular array is minimized.

6. The mechanism of claim 5 in which said pistons have their flanges nearer to one end thereof than to the other, and said alternate pistons are turned end for end relative to the other pistons whereby the flanges on adjacent pistons are axially offset from each other to permit said circumferential overlapping.

7. A fluid energy transfer mechanism comprising a housing enclosing a pair of rotary devices each including a cylinder block having reciprocable pistons therein, each device being capable of operating as either a motor or a pump, said cylinder blocks being mechanically connected for rotation in unison, the pistons in each block being mechanically connected to the pistons in the other block, a separate pair of high pressure and low pressure fluid ports communicating with each device, one of said devices operating as a motor when the fluid in the respective high pressure port is higher than the pressure of the fluid in the other high pressure port and driving the other device as a pump, the device operating as a motor receiving fluid through its high pressure port to cause the pistons to reciprocate and discharging the fluid through its low pressure port, the device being driven as a pump taking fluid from its low pressure port and discharging the same through its high pressure port, ported valve surfaces on each cylinder block opposite ported valve seats on the housing to control admission and discharge of fluid from said devices, said surfaces and seats lying in a cone and said cylinder blocks being independently axially movable, and means urging the blocks axially whereby the valve surfaces engage a respective valve seat.

8. A fluid energy transfer mechanism comprising a housing enclosing a pair of rotary devices each including a cylinder block having reciprocable pistons therein, each device being capable of operating as either a motor or a pump, said cylinder blocks being mechanically connected for rotation in unison, the pistons in each block being mechanically connected to the pistons in the other block, a separate pair of high pressure and low pressure fluid ports communicating with each device, one of said devices operating as a motor when the fluid in the respective high pressure port is higher than the pressure of the fluid in the other high pressure port and driving the other device as a pump, the device operating as a motor receiving fluid through its high pressure port to cause the pistons to reciprocate and discharging the fluid through its low pressure port, the device being driven as a pump taking fluid from its low pressure port and discharging the same through its high pressure port, ported valve surfaces on each cylinder block opposite ported valve seats on the housing to control admission and discharge of fluid from said devices, said cylinder blocks being independently axially movable, and means including a differential area on each cylinder block subject to fluid pressure urging the blocks axially into engagement with their respective valve seats whereby the valve surfaces engage their respective valve seats.

9. The mechanism of claim 7 in which said portings in the valve surfaces and seats comprise circular passages that intersect the respective valve surfaces and seats at substantially right angles thereto to provide full flow into and out of said cylinders when the valve surface portings are in register with the valve seat portings.

10. The mechanism of claim 7 in which said housing has a cylindrical bearing surface adjacent each of said valve seats, and bearing means between each cylinder block and the housing engaging a respective one of said bearing surfaces.

11. The mechanism of claim 7 in which said housing has a cylindrical bearing surface adjacent each end of the valve seats and bearing means between each cylinder block and the housing engaging such bearing surfaces.

12. A fluid energy transfer mechanism comprising a housing enclosing a pair of rotary devices each including a cylinder block having reciprocable pistons therein, each device being capable of operating as either a motor or a pump, said cylinder blocks being mechanically connected for rotation in unison, the pistons in each block being mechanically connected to the pistons in the other block, a separate pair of high pressure and low pressure fluid ports communicating with each device, one of said devices operating as a motor when the fluid in the respective high pressure port is higher than the pressure of the fluid in the other high pressure port and driving the other device as a pump, the device operating as a motor receiving fluid through its high pressure port to cause the pistons to reciprocate and discharging the fluid through its low pressure port, the device being driven as a pump taking fluid from its low pressure port and discharging the same through its high pressure port, ported valve surfaces on each cylinder block opposite ported valve seats on the housing to control admission and discharge of fluid from said devices, said cylinder blocks being independently axially movable, means urging said blocks axially whereby the valve surfaces engage a respective valve seat, and a sealing ring in running sealing engagement with an end surface of one of said cylinder blocks and sealed with respect to the housing to prevent leakage of fluid from one device to the other, said sealing ring being pressed by a first spring means into such running engagement with said one cylinder block and in a direction tending to unseat said one cylinder block from the respective valve seat, and other spring means acting on said one cylinder block in opposition to the first spring means and being stronger than the same to prevent unseating of said one cylinder block from the respective valve seat.

13. A fluid energy transfer mechanism comprising a housing enclosing a pair of rotary devices each including a cylinder block having reciprocable pistons therein, each device being capable of operating as either a motor or a pump, said cylinder blocks being mechanically connected for rotation in unison, the pistons in each block being mechanically connected to the pistons in the other block, a separate pair of high pressure and low pressure fluid ports communicating with each device, one of said devices operating as a motor when the fluid in the respective high pressure port is higher than the pressure of the fluid in the other high pressure port and driving the other device as a pump, the device operating as a motor receiving fluid through its high pressure port to cause the pistons to reciprocate and discharging the fluid through its low pressure port, the device being driven as a pump taking fluid from its low pressure port and discharging the same through its high pressure port, ported valve surfaces on each cylinder block opposite ported valve seats on the housing to control admission and discharge of fluid from said devices, said cylinder blocks being independently axially movable, and means urging the blocks axially whereby the valve surfaces engage a respective valve seat, said valve surfaces being frusto-conical and each cylinder block having axially extending cylinder bores receiving said pistons, said cylinder block portings comprising angularly extending openings connecting the cylinder bores to the respective frusto-conical valve surfaces and providing with the cylinder end wall a differential area subject to fluid pressure within the particular cylinder and opening effective to urge the particular cylinder block against its respective valve seat.

14. A fluid energy transfer mechanism comprising a housing enclosing a pair of rotary devices each including reciprocable pistons, each device being capable of operating as either a motor or a pump, said devices being mechanically connected for rotation in unison, the pistons in each device being mechanically connected to the pistons in the other device, a separate pair of high pressure and low pressure fluid ports communicating with each device, one of said devices operating as a motor when the fluid in the respective high pressure port is higher than the pressure of the fluid in the other high pressure port and driving the other device as a pump, the device operating as a motor receiving fluid through its high pressure port to cause the pistons to reciprocate and discharging such fluid through its low pressure port, the device being driven as a pump taking fluid from its low pressure port and discharging the same through its high pressure port, and duct means in each device receiving leakage fluid from the high pressure areas of the respective device and directing the same to a low pressure area of such device whereby leakage of fluid from one device to the other is prevented.

15. The mechanism of claim 14 in which the housing has a separate drain port for each device and said ducts direct the leakage fluid to the respective drain port.

16. The mechanism of claim 14 in which there is a cam means within the housing engaged by said pistons for causing rotation of the devices upon reciprocation of the pistons, each device including a separate cylinder block with cylinder bores therein open at one end thereof to the housing interior and receiving opposite ends of said pistons, the bores of one cylinder block having an isolation groove in the walls thereof connected to the duct means for that block to prevent leakage of fluid from said one end of the cylinder bores, the bores of the other cylinder block being devoid of such isolation grooves to permit leakage of fluid therefrom into said housing interior for lubricating said cam means.

17. A hydraulic energy transfer mechanism comprising a housing enclosing a pair of rotary devices each including a cylinder block with reciprocable pistons therein, each device being capable of operating as either a motor or a pump, said devices being mechanically connected for rotation in unison, the pistons in each device being mechanically connected to the pistons in the other device, a separate pair of high pressure and low pressure fluid ports communicating with each device, one of said devices operating as a motor when the fluid in the respective high pressure port is higher than the pressure of the fluid in the other high pressure port and driving the other device as a pump, the device operating as a motor receiving fluid through its high pressure port to cause the pistons to reciprocate and discharging such fluid through its low pressure port, the device being driven as a pump taking fluid from its low pressure port and discharging the same through its high pressure port, each of said pistons having a single circular flange of enlarged diameter intermediate its ends engaging a cam track within the housing to cause rotation of said devices as an incident to reciprocation of said pistons and to cause rotation of each piston about its own axis as it reciprocates.

18. The mechanism of claim 17 in which each piston has a separate piston head nonrotatably attached thereto whereby said heads rotate with their respective pistons.

19. The mechanism of claim 17 in which each piston head is cup-shape and is attached to its piston by a lock wire inserted into complementary opposed grooves in telescoping portions of the pistons and heads through a tangential opening through the side of the piston head, and there is a plug in such tangential opening to prevent passage of fluid from the exterior of the piston head to its interior.

20. A hydraulic energy transfer mechanism comprising a housing enclosing a pair of rotary devices each including a cylinder block having reciprocable pistons therein, each device being capable of operating as either a motor or a pump, said cylinder blocks being mechanically connected for rotation in unison, the pistons in each block being mechanically connected to the pistons in the other block, a separate pair of high pressure and low pressure fluid ports communicating with each device, one of said devices operating as a motor when the fluid in the respective high pressure port is higher than the pressure of the fluid in the other high pressure port and driving the other device as a pump, the device operating as a motor receiving fluid through its high pressure port to cause the pistons to reciprocate and discharging the fluid through its low pressure port, the device being driven as a pump taking fluid from its low pressure port and discharging the same through its high pressure port, said housing including a pair of members engageable with each other, and retaining means extending axially through said devices and engaging said housing members to hold the same in engagement with each other.

21. The mechanism of claim 20 in which said retaining means engages the housing members a substantial distance inwardly of their outer ends, said outer ends being free of engagement with said retaining means whereby the portions of said housing members outwardly of the engagement thereof with the retaining means may undergo thermal expansion without imposing additional load upon the retaining means.

22. The mechanism of claim 20 in which each of said housing members includes a pintle therein that has passages providing communication between said pairs of high and low pressure ports and the respective device, said pintles being engaged by said retaining means and engaging the housing members to hold the same together.

23. The mechanism of claim 20 in which there is a drain port adapter between housing member and the respective end of the retaining means, and duct means for directing internal leakage fluid from each device to a port in each adapter leading to the exterior thereof.

24. The mechanism of claim 22 in which said pintles engage the housing members inwardly of the outer ends of the latter and said outer ends are free to move to accommodate thermal expansion of the housing members.

25. In combination, first and second fluid systems each comprising a tank, a pump, a directional control valve, and a fluid motor interconnected so that said pump draws fluid from said tank and delivers such fluid under pressure to said motor via said valve, and so that fluid displaced by said motor is returned to said tank via said valve; a fluid energy transfer mechanism comprising a housing having ports connected to the delivery and intake sides of the respective pumps; and a rotary dual unit in said housing of which one unit, in the event of decrease in pressure in either system, operates as a fluid motor from fluid pressure in the other system to drive the other unit as a pump to augment the delivery of the pump in the system in which the pressure has so decreased.

26. The combination of claim 25 wherein said housing has separate drain ports connected to the respective tanks for conducting fluid leaking past the respective units to the respective systems.

References Cited

UNITED STATES PATENTS

| | | | |
|---|---|---|---|
| 2,230,744 | 2/1941 | Disbro | 308—184 |
| 2,532,327 | 12/1950 | Parks | 308—184 |
| 2,862,449 | 12/1958 | Wyland | 103—49 |
| 2,935,952 | 5/1960 | Rose | 103—45 |

ROBERT M. WALKER, *Primary Examiner.*